United States Patent
Uebayashi et al.

(10) Patent No.: US 6,181,944 B1
(45) Date of Patent: Jan. 30, 2001

(54) MOBILE STATION POSITION ESTIMATION SCHEME FOR CELLULAR MOBILE COMMUNICATION SYSTEM

(75) Inventors: Shinji Uebayashi; Kouji Ohno; Seizo Onoe, all of Yokohama (JP)

(73) Assignee: NTT Mobile Communications Network Inc., Tokyo (JP)

( * ) Notice: Under 35 U.S.C. 154(b), the term of this patent shall be extended for 0 days.

(21) Appl. No.: 09/041,764

(22) Filed: Mar. 13, 1998

(30) Foreign Application Priority Data

Mar. 14, 1997 (JP) .................................................... 9-061170

(51) Int. Cl.[7] ...................................................... H04Q 7/20
(52) U.S. Cl. ............................ 455/456; 455/422; 455/432; 455/456; 455/457
(58) Field of Search .................................. 455/422, 456, 455/457; 701/207; 342/442, 457

(56) References Cited

U.S. PATENT DOCUMENTS

| | | | |
|---|---|---|---|
| 3,646,580 | * | 2/1972 | Fuller et al. .......................... 455/524 |
| 5,508,708 | | 4/1996 | Ghosh et al. . |
| 5,883,598 | * | 3/1999 | Parl et al. ............................ 342/457 |
| 5,945,949 | * | 8/1999 | Yun ...................................... 342/457 |
| 5,973,643 | * | 10/1999 | Hawkes et al. ...................... 342/457 |
| 6,011,974 | * | 1/2000 | Cedervall et al. ................... 455/456 |
| 6,026,305 | * | 1/2000 | Salinger et al. ..................... 455/456 |

* cited by examiner

*Primary Examiner*—Daniel S. Hunter
*Assistant Examiner*—Yemane Woldetatios
(74) *Attorney, Agent, or Firm*—Oblon, Spivak, McClelland, Maier & Neustadt, P.C.

(57) ABSTRACT

A mobile station position estimation scheme for a cellular mobile communication system which is capable of estimating a position of a mobile station in a simple manner even in the general cellular mobile communication systems in which base stations are not synchronized. According to this mobile station position estimation scheme, a first signal sequence and a second signal sequence which are uniquely predetermined for the mobile station are exchanged between the mobile station and the base station, and then a position of the mobile station is estimated at one station among the base station and the mobile station, by obtaining a phase difference between the first signal sequence and the second signal sequence and calculating an estimated distance between the base station and the mobile station according to the phase difference.

40 Claims, 9 Drawing Sheets

MOBILE STATION POSITION ESTIMATION SCHEME FOR CELLULAR MOBILE COMMUNICATION SYSTEM

BACKGROUND OF THE INVENTION

1. Field of the Invention

The present invention relates to a mobile station position estimation scheme for estimating a position of a mobile station in a cellular mobile communication system for carrying out communications between a mobile station and base stations, and a base station device and a mobile station device for realizing this mobile station position estimation scheme.

2. Description of the Background Art

In the conventional cellular mobile communication system, it has been impossible to estimate a position of a mobile station in communication state, and for this reason it has been pointed out that there is a problem that a position of a source of an emergency call (such as dial "110" and "119" in Japan, dial "911" in U.S.A.) cannot be identified.

There are well known radio based techniques for estimating a position such as the radio navigation schemes for airplanes and ships (beacon, loran, microwave landing system, etc.). However, these techniques are not suitable for the cellular mobile communications.

Namely, the beacon requires a radar on a mobile station device so that it is not suitable for compact implementation of a mobile station device. The hyperbolic line of position scheme such as loran requires synchronization among base stations. In general, base stations of the cellular mobile communications are not synchronized with each other so that this scheme is not applicable to the cellular mobile communications, except for the IS-95 scheme of the American ELA/TIA standard which has synchronization among base stations. The microwave landing system can measure a position of an airplane within a particular area at high precision by using a special directional antenna, but it is difficult to measure an arbitrary position of a mobile station by using a simple radio equipment.

Recently, the position measurement scheme called GPS (Global Positioning System) that utilizes satellite has become popular, but this is also a system that requires high precision synchronization among satellite stations, and therefore it is applicable only to the IS-95 scheme mentioned above, and not applicable to the general cellular mobile communication systems which are asynchronous systems.

Thus there has been a problem that the conventionally known radio based position estimation techniques are not suitable for the general cellular mobile communications because the compact implementation of a mobile station device or a radio device of a base station becomes difficult and the synchronization among base stations is required.

SUMMARY OF THE INVENTION

It is therefore an object of the present invention to provide a mobile station position estimation scheme for a cellular mobile communication system which is capable of estimating a position of a mobile station in a simple manner even in the general cellular mobile communication systems in which base stations are not synchronized.

According to one aspect of the present invention there is provided a mobile station position estimation method in a cellular mobile communication for carrying out communications between mobile stations and base stations, comprising the steps of: (a) exchanging between a base station and a mobile station a first signal sequence and a second signal sequence which are uniquely predetermined for the mobile station; and (b) estimating a position of the mobile station at one station among the base station and the mobile station, by obtaining a phase difference between the first signal sequence and the second signal sequence and calculating an estimated distance between the base station and the mobile station according to the phase difference.

According to another aspect of the present invention there is provided a base station device at a base station in a cellular mobile communication system for carrying out communications between mobile stations and base stations, comprising: a reception unit for receiving a first signal sequence transmitted by a mobile station, which is uniquely predetermined for the mobile station; and a transmission unit for transmitting a second signal sequence which is uniquely predetermined for the mobile station, to the mobile station in synchronization with the first signal sequence received by the reception unit, so as to enable the mobile station to estimate a position of the mobile station by calculating an estimated distance between the base station and the mobile station according to a phase difference between the first signal sequence and the second signal sequence.

According to another aspect of the present invention there is provided a mobile station device at a mobile station in a cellular mobile communication system for carrying out communications between base stations and mobile stations, comprising: a reception unit for receiving a first signal sequence transmitted by a base station, which is uniquely predetermined for the mobile station; and a transmission unit for transmitting a second signal sequence which is uniquely predetermined for the mobile station, to the base station in synchronization with the first signal sequence received by the reception unit, so as to enable the base station to estimate a position of the mobile station by calculating an estimated distance between the base station and the mobile station according to a phase difference between the first signal sequence and the second signal sequence.

According to another aspect of the present invention there is provided a base station device at a base station in a cellular mobile communication system for carrying out communications between mobile stations and base stations, comprising: a transmission unit for transmitting to a mobile station a first signal sequence which is uniquely predetermined for the mobile station; a reception unit for receiving a second signal sequence transmitted by the mobile station, which is uniquely predetermined for the mobile station; and a position estimation unit for estimating a position of the mobile station by obtaining a phase difference by comparing phases of the first signal sequence transmitted by the transmission unit and the second signal sequence received by the reception unit, and calculating an estimated distance between the base station and the mobile station according to the phase difference.

According to another aspect of the present invention there is provided a mobile station device at a mobile station in a cellular mobile communication system for carrying out communications between mobile stations and base stations, comprising: a transmission unit for transmitting to a base station a first signal sequence which is uniquely predetermined for the mobile station; a reception unit for receiving a second signal sequence transmitted by the base station, which is uniquely predetermined for the mobile station; and a position estimation unit for estimating a position of the mobile station by obtaining a phase difference by comparing phases of the first signal sequence transmitted by the transmission unit and the second signal sequence received by the reception unit, and calculating an estimated distance between the base station and the mobile station according to the phase difference.

According to another aspect of the present invention there is provided a base station device at a base station in a cellular mobile communication system for carrying out communications between mobile stations and base stations, comprising: a transmission unit for transmitting to a mobile station a first signal sequence which is uniquely predetermined for the mobile station; a reception unit for receiving a second signal sequence which is uniquely predetermined for the mobile station and information on a first phase difference indicating a phase difference between the first signal sequence and the second signal sequence as obtained by the mobile station, which are transmitted by the mobile station; and a position estimation unit for estimating a position of the mobile station by obtaining a second phase difference by comparing phases of the first signal sequence transmitted by the transmission unit and the second signal sequence received by the reception unit, and calculating an estimated distance between the base station and the mobile station according to the first phase difference received by the reception unit and the second phase difference.

According to another aspect of the present invention there is provided a mobile station device at a mobile station in a cellular mobile communication system for carrying out communications between mobile stations and base stations, comprising: a transmission unit for transmitting to a base station a first signal sequence which is uniquely predetermined for the mobile station; a reception unit for receiving a second signal sequence which is uniquely predetermined for the mobile station and information on a first phase difference indicating a phase difference between the first signal sequence and the second signal sequence as obtained by the base station, which are transmitted by the base station; and a position estimation unit for estimating a position of the mobile station by obtaining a second phase difference by comparing phases of the first signal sequence transmitted by the transmission unit and the second signal sequence received by the reception unit, and calculating an estimated distance between the base station and the mobile station according to the first phase difference received by the reception unit and the second phase difference.

According to another aspect of the present invention there is provided a base station device at a base station in a cellular mobile communication system for carrying out communications between mobile stations and base stations, comprising: a reception unit for receiving a first signal sequence transmitted by a mobile station, which is uniquely predetermined for the mobile station; and a transmission unit for obtaining a first phase difference by comparing phases of the first signal sequence received by the reception unit and a second signal sequence which is uniquely predetermined for the mobile station, and transmitting the second signal sequence and information on the first phase difference to the mobile station, so as to enable the mobile station to obtain a second phase difference by comparing phases of the first signal sequence and the second signal sequence and estimate a position of the mobile station by calculating an estimated distance between the base station and the mobile station according to the first phase difference and the second phase difference.

According to another aspect of the present invention there is provided a mobile station device at a mobile station in a cellular mobile communication system for carrying out communications between mobile stations and base stations, comprising: a reception unit for receiving a first signal sequence transmitted by a base station, which is uniquely predetermined for the mobile station; and a transmission unit for obtaining a first phase difference by comparing phases of the first signal sequence received by the reception unit and a second signal sequence which is uniquely predetermined for the mobile station, and transmitting the second signal sequence and information on the first phase difference to the base station, so as to enable the base station to obtain a second phase difference by comparing phases of the first signal sequence and the second signal sequence and estimate a position of the mobile station by calculating an estimated distance between the base station and the mobile station according to the first phase difference and the second phase difference.

Other features and advantages of the present invention will become apparent from the following description taken in conjunction with the accompanying drawings.

DETAILED DESCRIPTION OF THE PREFERRED EMBODIMENTS

Referring now to FIG. 1 to FIG. 6, the first embodiment of a mobile station position estimation scheme for a cellular mobile communication system according to the present invention will be described in detail.

Figure 1:
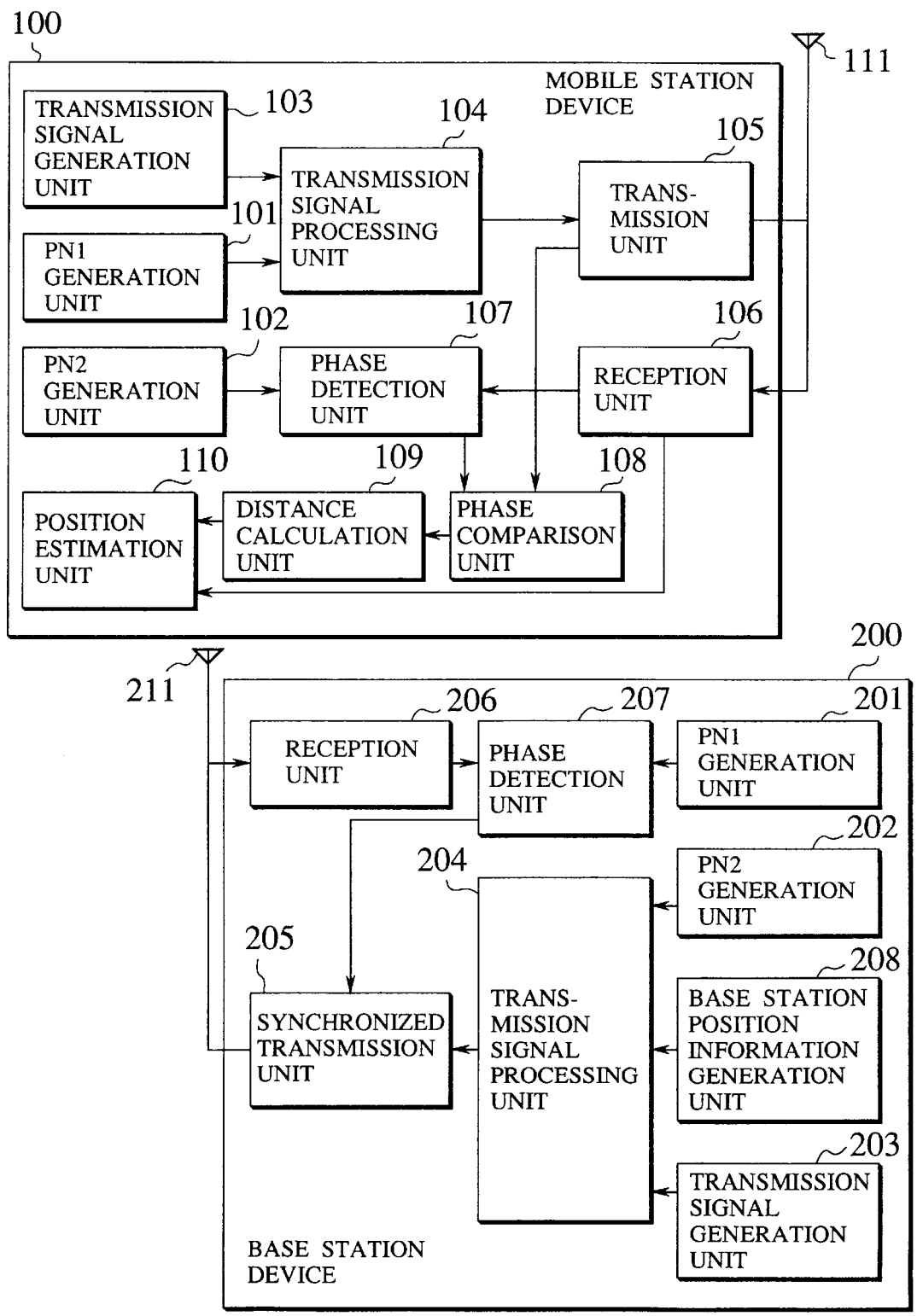
FIG. 1 is a block diagram of a mobile station device and a base station device for realizing a mobile station position estimation scheme according to the first embodiment of the present invention.

FIG. 1 show configurations of a mobile station device 100 and a base station device 200 for realizing the mobile station position estimation scheme of the first embodiment, for an exemplary case in which the mobile station device 100 measures a distance from the base station device 200 and estimates its own position.

The mobile station device 100 comprises a PN1 generation unit 101 for generating a first unique signal sequence PN1, a PN2 generation unit 102 for generating a second unique signal sequence PN2, a transmission signal generation unit 103 for generating transmission signals, a transmission signal processing unit 104 for obtaining mobile station transmission signals of a prescribed format using the transmission signals from the transmission signal generation unit 103 and the first unique signal sequence PN1 from the PN1 generation unit 101, a transmission unit 105 for transmitting the mobile station transmission signals from the transmission signal processing unit 104 through an antenna 111, a reception unit 106 for receiving base station transmission signals from a base station through the antenna 111, a phase detection unit 107 for detecting a phase of received signals received by the reception unit 106, a phase comparison unit 108 for comparing phases of the received signals and the mobile station transmission signals to obtain a phase difference, a distance calculation unit 109 for calculating a distance between the mobile station device 100 and the base station device 200 according to the phase difference obtained by the phase comparison unit 108, and a position estimation unit 110 for estimating a position of the mobile station device 100 according to the distance calculated by the distance calculation unit 109.

On the other hand, the base station device 200 comprises a reception unit 206 for receiving the mobile station transmission signals from a mobile station through an antenna 211, a phase detection unit 207 for detecting a phase of received signals received by the reception unit 206, a PN1 generation unit 201 for generating the first unique signal sequence PN1, a PN2 generation unit 202 for generating the second unique signal sequence PN2, a transmission signal generation unit 203 for generating transmission signals, a base station position information generation unit 208 for generating a base station position information, a transmission signal processing unit 204 for obtaining base station transmission signals of a prescribed format using the transmission signals from the transmission signal generation unit 203, the second unique signal sequence PN2 from the PN2 generation unit 202 and the base station position information from the base station position information generation unit 208, and a synchronized transmission unit 205 for transmitting the base station transmission signals from the transmission signal processing unit 204 in synchronization with the received signals received from the mobile station.

Note here that the first unique signal sequence PN1 and the second unique signal sequence PN2 are signal sequences that are uniquely predetermined for each mobile station.

In the mobile station device 100 and the base station device 200 with these configuration, the mobile station position estimation is carried out, for example, when this mobile station originates an emergency call, when a user of this mobile station wishes to check his/her own position, when a user of a fixed network or another mobile station wishes to check a position of this mobile station, etc. When this mobile station originates an emergency call, the position estimation can be realized by carrying out the following operation in a course of a call origination procedure. When a user of this mobile station wishes to check his/her own position, the user issues a position check request signal to the mobile station device 100 such that the mobile station device 100 carries out the following operation upon receiving this position check request signal. When a user of a fixed network or another mobile station wishes to check a position of this mobile station, a position check request signal is transmitted to the mobile station device 100 from a base station which is currently in communication with this mobile station such that the mobile station device 100 carries out the following operation upon receiving this position check request signal.

Namely, upon receiving the position check request signal, the mobile station device 100 generates the first unique signal sequence PN1 to be used for the position estimation at the PN1 generation unit 101. Then, the transmission signal processing unit 104 converts this first unique signal sequence PN1 along with any other necessary transmission signals from the transmission signal generation unit 103 into a prescribed format, so as to obtain a position estimation reference signal, and the transmission unit 105 transmits this position estimation reference signal to the base station device 200 through the antenna 111.

When this position estimation reference signal from the mobile station is received through the antenna 211 at the reception unit 206 of the base station device 200, the first unique signal sequence PN1 is generated at the PN1 generation unit 201, and a phase of PN1 in the received position estimation reference signal is detected by using the generated PN1 at the phase detection unit 207. Then, the second unique signal sequence PN2 is generated at the PN2 generation unit 202, and the transmission signal processing unit 204 converts this second unique signal sequence PN2 along with the base station position information from the base station position information generation unit 208 and any other necessary transmission signals from the transmission signal generation unit 203 into a prescribed format, so as to obtain a position estimation response signal. The synchronized transmission unit 205 then transmits this position estimation response signal to the mobile station device 100 through the antenna 211 in synchronization with the phase of the received PN1. Here, the base station position information is an information indicating latitude, longitude and altitude of the base station, for example.

When this position estimation response signal from the base station is received through the antenna 111 at the reception unit 106 of the mobile station device 100, the second unique signal sequence PN2 is generated at the PN2 generation unit 102, and a phase of PN2 in the received position estimation response signal is detected by using the generated PN2 at the phase detection unit 107. Then, the phase comparison unit 108 compares the phase of PN1 in the position estimation reference signal transmitted by the transmission unit 105 and the phase of PN2 in the position estimation response signal received by the reception unit 106, and detects their phase difference. Then, the distance calculation unit 109 calculates a distance between the mobile station device 100 and the base station device 200 from this phase difference, and the position estimation unit 110 estimates the position of this mobile station from the distance calculated by the distance calculation unit 109 and the base station position information of the base station device 200 contained in the position estimation response signal received by the reception unit 106.

Figure 2:
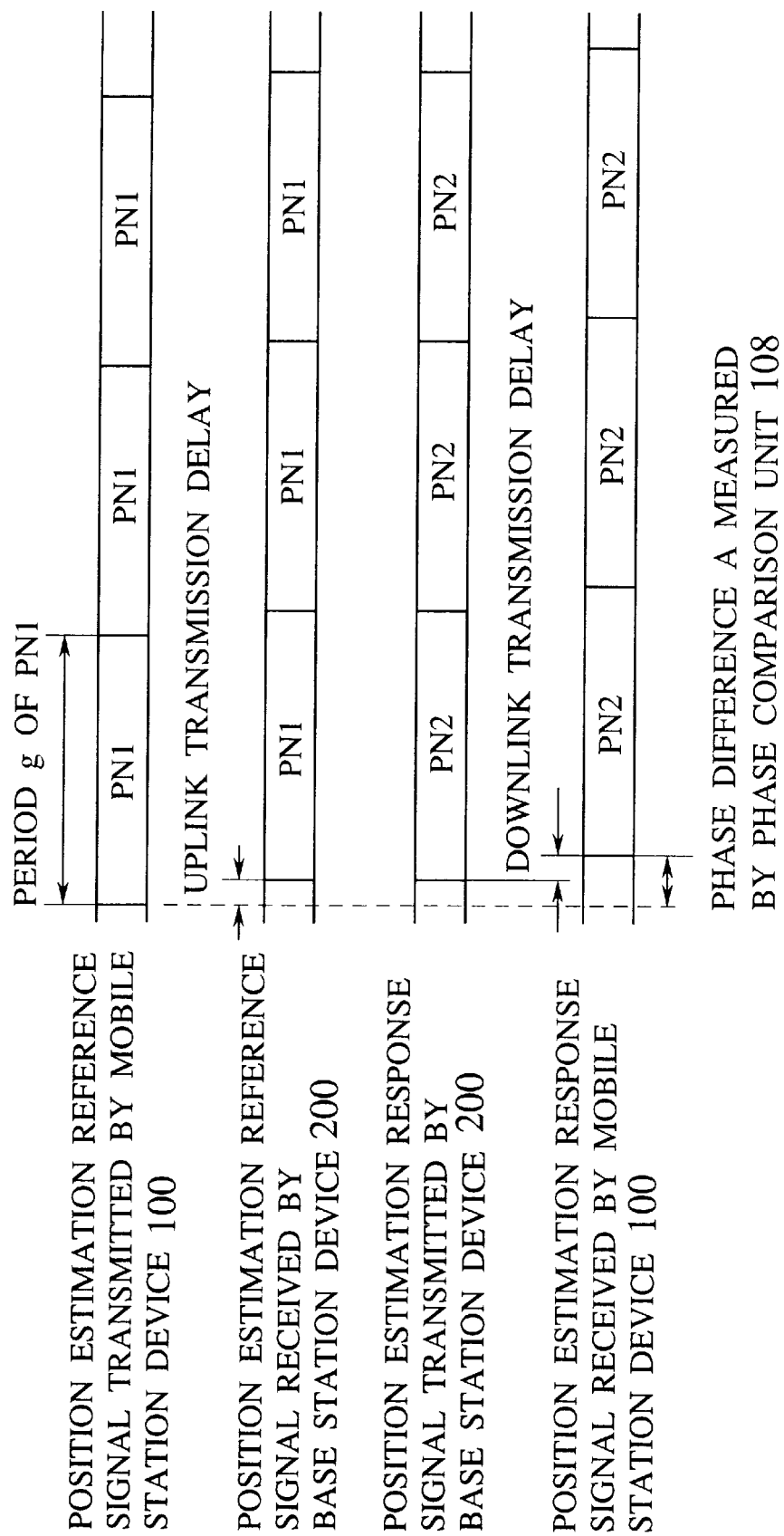
FIG. 2 is a timing chart for explaining a manner of calculating a distance between a mobile station and a base station in a mobile station position estimation scheme according to the first embodiment of the present invention.

FIG. 2 is a timing chart for explaining the principle for calculating the distance between the base station and the mobile station in this first embodiment. FIG. 2 shows an exemplary case where the first and second unique signal sequences PN1 and PN2 have the equal period. Here, PN1 and PN2 are used as marker signals for measuring a transmission time, and there is no need to continuously transmit them throughout the position estimation period. For example, signals to be transmitted periodically such as frame synchronization signal can be used as PN1 and PN2.

The position estimation reference signal transmitted from the mobile station device 100 is received at the base station device 200 after as much delay as a transmission time of an uplink transmission path. The base station device 200 transmits the position estimation response signal in synchronization with the received position estimation reference signal. The mobile station device 100 receives this position estimation response signal after as much delay as a transmission time of a downlink transmission path, and compares the phase of the transmitted position estimation reference signal with the phase of the received position estimation response signal. Here, the measured phase difference can be converted into a time value A [sec.], where A represents a transmission delay time for going and returning. Consequently, the distance D between the mobile station device 100 and the base station device 200 can be given by:

$$D=Ac/2 \ [m]$$

where c is the speed of light (which is approximately equal to $3 \times 10^8$ m/s).

Figure 3:
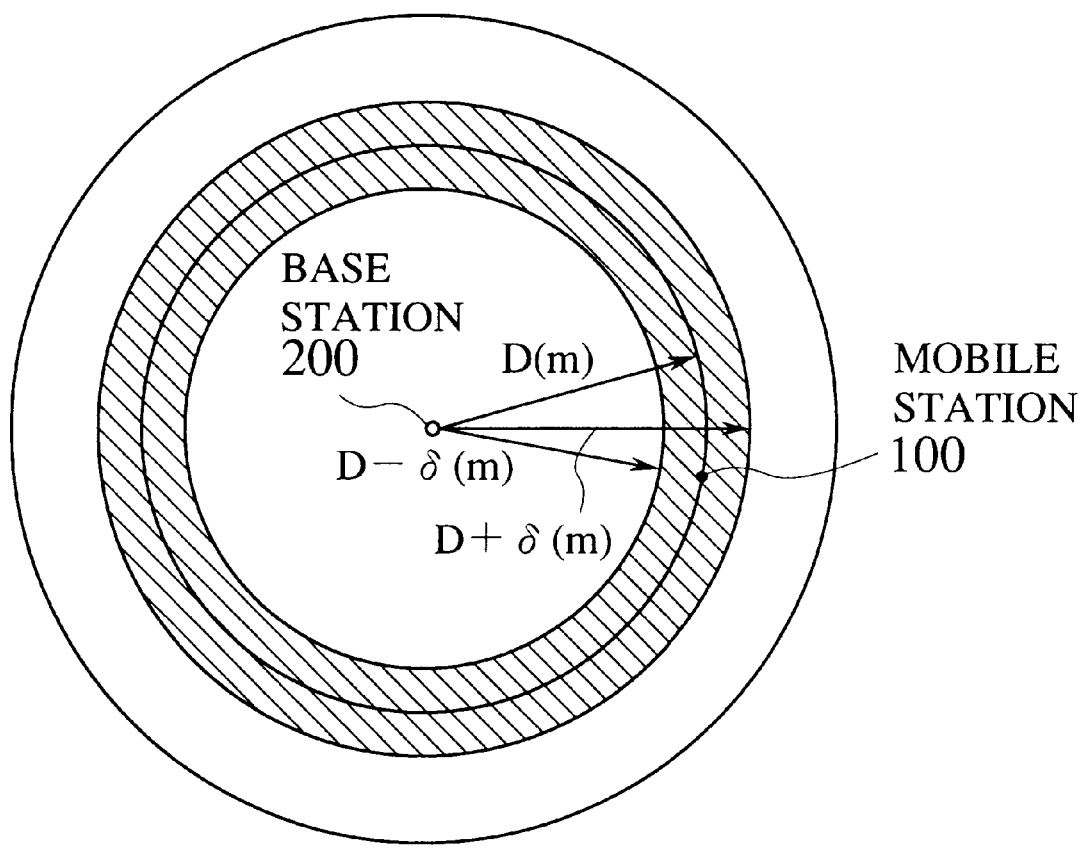
FIG. 3 is a diagram showing an exemplary estimated position of the mobile station obtained by a mobile station position estimation scheme according to the first embodiment of the present invention, for a case of using one base station.

FIG. 3 illustrates a manner of estimating the mobile station position in this first embodiment. Namely, it is possible to estimate the mobile station device 100 as existing on a circle distanced from the base station device 200 by the distance D. In practice, the measured phase difference contains some error. Taking this error into account, the phase difference as converted into a time value can be given by A±α [sec.], for example, and then the distance D can be expressed as:

$$(A\pm\alpha)c=D\pm\alpha=D\pm\delta$$

where δ=αc. In this case, the estimated position is given by a shaded region shown in FIG. 3.

Figure 4:
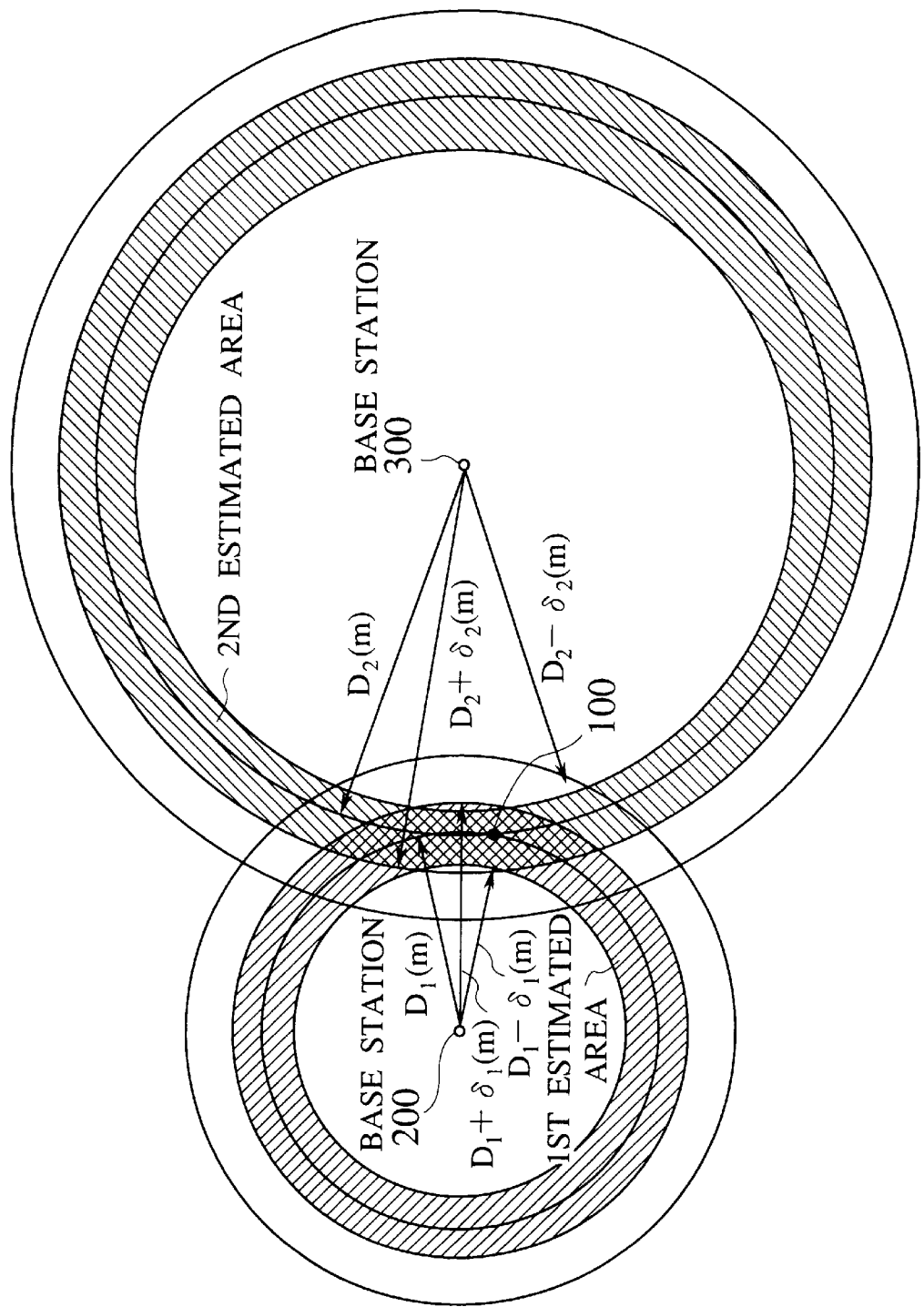
FIG. 4 is a diagram showing an exemplary estimated position of the mobile station obtained by a mobile station position estimation scheme according to the first embodiment of the present invention, for a case of using two base stations.

It is possible to improve the precision of the estimated position if the mobile station measures distances with respect to a plurality of base stations. FIG. 4 shows an exemplary case where distances with respect to two base stations are measured. In this case, the mobile station device 100 measures the distance with respect to the base station device 200 by the above described procedure first. When the distance between the mobile station device 100 and the base station device 200 is given by D1±δ1 [m] by accounting for error, the first estimated area (a single hatching circular area centered around the base station device 200) shown in FIG. 4 can be obtained. Next, the mobile station device 100 similarly measures the distance with respect to another base station device 300 by the above described procedure. When the distance between the mobile station device 100 and the base station device 300 is given by D2±δ2 [m] by accounting for error, the second estimated area (a single hatching circular area centered around the base station device 300) shown in FIG. 4 can be obtained. Then, the estimated position of the mobile station device 100 is given by an overlapping portion (a double hatching area) of the first estimated area and the second estimated area.

Figure 5:
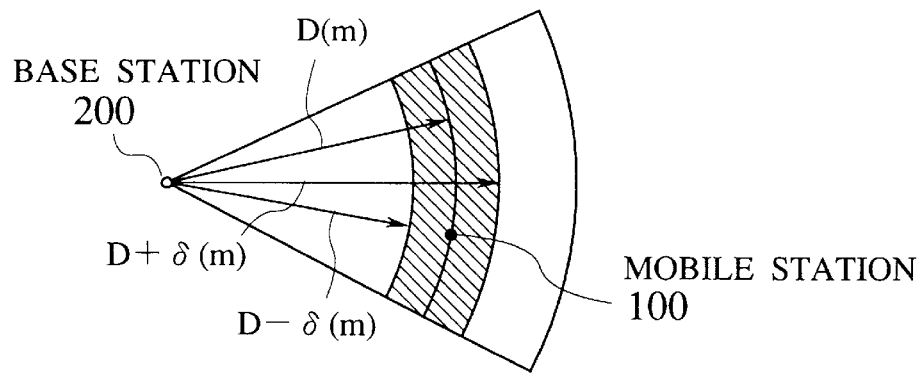
FIG. 5 is a diagram showing an exemplary estimated position of the mobile station obtained by a mobile station position estimation scheme according to the first embodiment of the present invention, for a case of using one sector of one base station.
Figure 6:
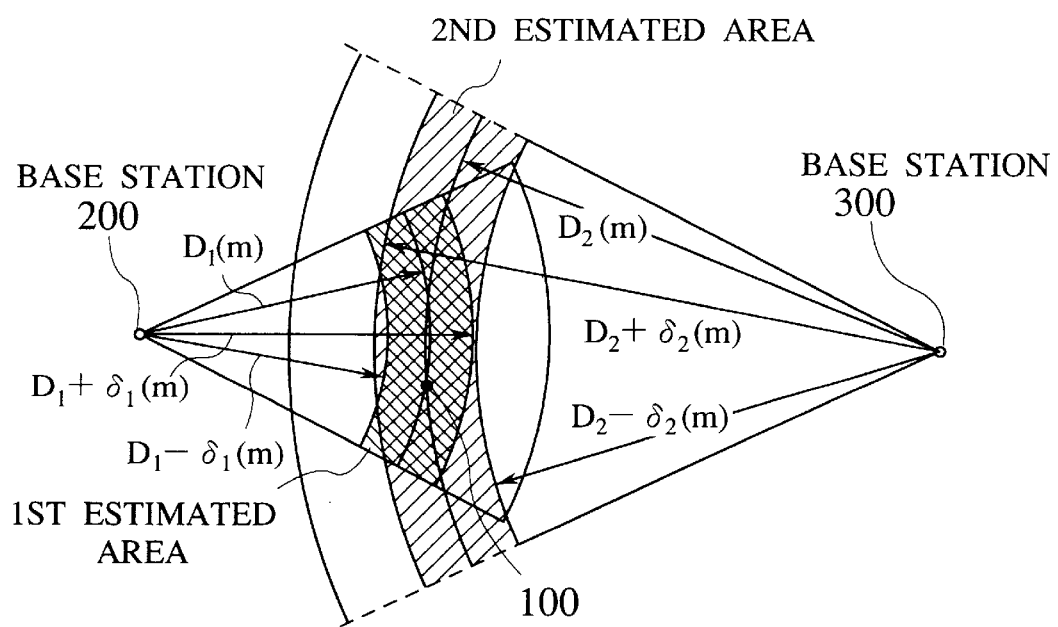
FIG. 6 is a diagram showing an exemplary estimated position of the mobile station obtained by a mobile station position estimation scheme according to the first embodiment of the present invention, for a case of using two sectors of two base stations.

In addition, when each base station device 200 or 300 covers its cell by a plurality of sectors, it is possible to further improve the precision of the estimated position by carrying out the position estimation for the mobile station device 100 within a sector of the base station device 200 or 300 which is currently in communication with the mobile station device 100, as shown in FIG. 5 for a case of using one base station and FIG. 6 for a case of using two base stations.

Figure 7:
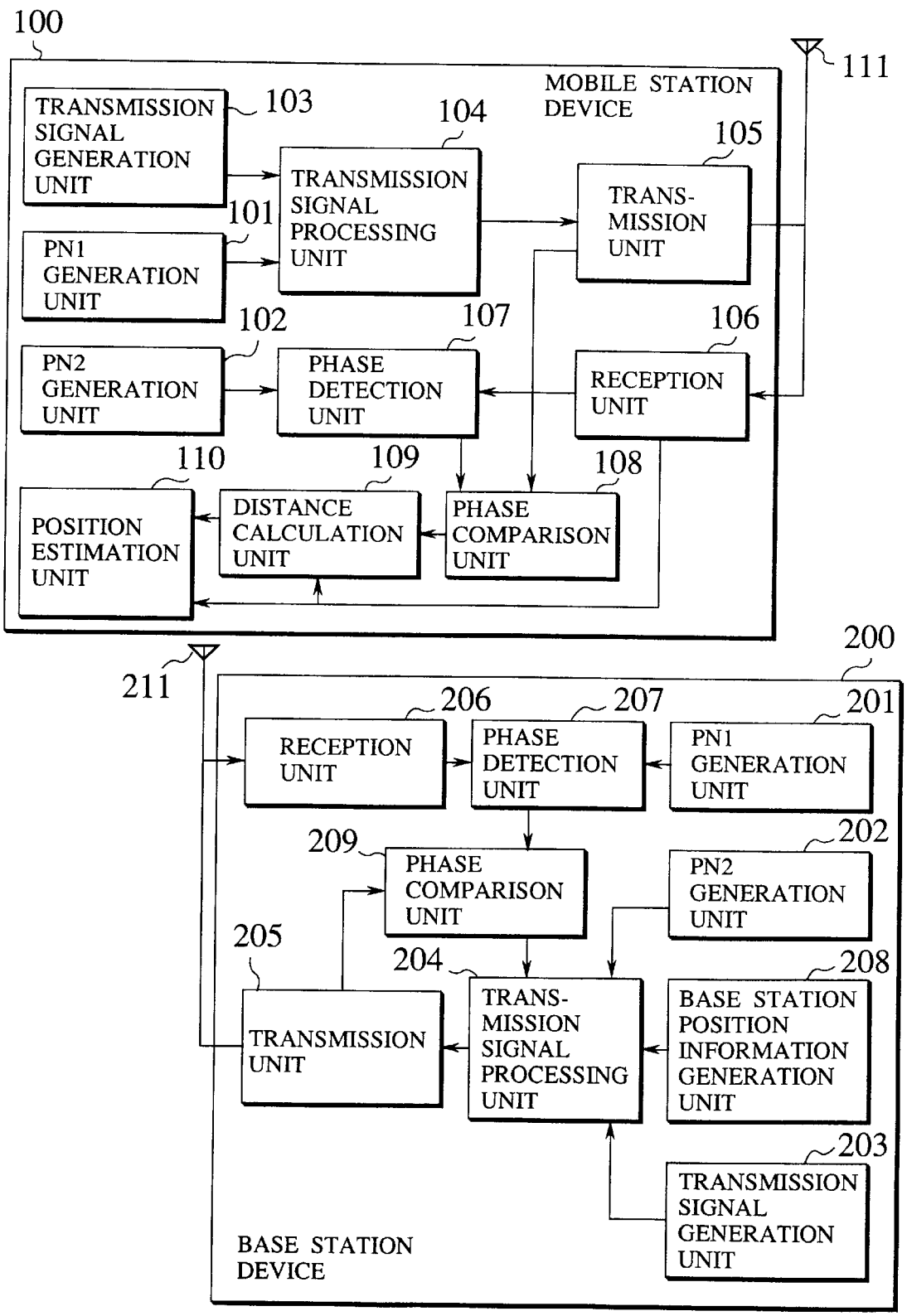
FIG. 7 is a block diagram of a mobile station device and a base station device for realizing a mobile station position estimation scheme according to the second embodiment of the present invention.
Figure 8:
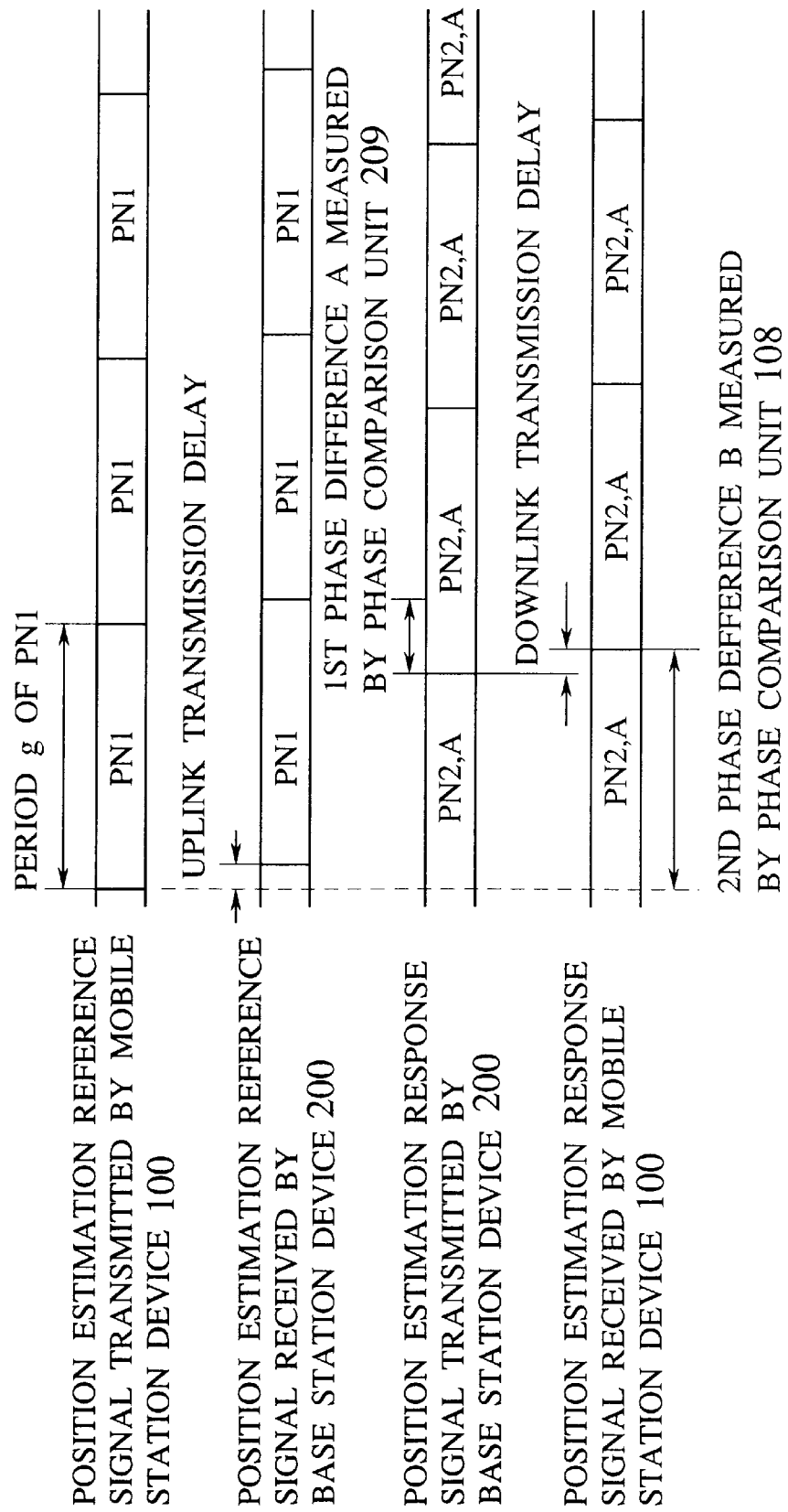
FIG. 8 is a timing chart for explaining a manner of calculating a distance between a mobile station and a base station in a mobile station position estimation scheme according to the second embodiment of the present invention.

Referring now to FIG. 7 and FIG. 8, the second embodiment of a mobile station position estimation scheme for a cellular mobile communication system according to the present invention will be described in detail.

FIG. 7 show configurations of a mobile station device 100 and a base station device 200 for realizing the mobile station position estimation scheme of the second embodiment, where the mobile station device 100 has the same configuration as in FIG. 1 described above, whereas the base station device 200 has a configuration different from that of FIG. 1 in that a phase comparison unit 209 is additionally provided and the transmission unit 205 is not a synchronized transmission unit. The other elements identical to those of FIG. 1 are given the same reference numerals in FIG. 7.

In this second embodiment, the initial operation of the mobile station device 100 is the same as in the first embodiment. Namely, upon receiving the position check request signal, the mobile station device 100 generates the first unique signal sequence PN1 to be used for the position estimation at the PN1 generation unit 101. Then, the transmission signal processing unit 104 converts this first unique signal sequence PN1 along with any other necessary transmission signals from the transmission signal generation unit 103 into a prescribed format, so as to obtain a position estimation reference signal, and the transmission unit 105 transmits this position estimation reference signal to the base station device 200 through the antenna 111.

When this position estimation reference signal from the mobile station is received through the antenna 211 at the reception unit 206 of the base station device 200, the first unique signal sequence PN1 is generated at the PN1 generation unit 201, and a phase of PN1 in the received position estimation reference signal is detected by using the generated PN1 at the phase detection unit 207. Then, the second unique signal sequence PN2 is generated at the PN2 generation unit 202, and the phase comparison unit 209 compares the detected phase of PN1 in the received position estimation reference signal and the phase of PN2 to be included in the base station transmission signals so as to obtain a first phase difference. Then, the transmission signal processing unit 204 converts this second unique signal sequence PN2 and information on the first phase difference along with the base station position information from the base station position information generation unit 208 and any other necessary transmission signals from the transmission signal generation unit 203 into a prescribed format, so as to obtain a position estimation response signal. The transmission unit 205 then transmits this position estimation response signal to the mobile station device 100 through the antenna 211 in synchronization with the phase of the received PN1.

When this position estimation response signal from the base station is received through the antenna 111 at the reception unit 106 of the mobile station device 100, the second unique signal sequence PN2 is generated at the PN2 generation unit 102, and a phase of PN2 in the received position estimation response signal is detected by using the generated PN2 at the phase detection unit 107. Then, the phase comparison unit 108 compares the phase of PN1 in the position estimation reference signal transmitted by the transmission unit 105 and the phase of PN2 in the position estimation response signal received by the reception unit 106, so as to obtain a second phase difference. Then, the distance calculation unit 109 calculates a distance between the mobile station device 100 and the base station device 200 from the first phase difference indicated in the position estimation response signal received by the reception unit 106 and the second phase difference obtained by the phase comparison unit 108, and the position estimation unit 110 estimates the position of this mobile station from the distance calculated by the distance calculation unit 109 and the base station position information of the base station device 200 contained in the position estimation response signal received by the reception unit 106.

FIG. 8 is a timing chart for explaining the principle for calculating the distance between the base station and the mobile station in this second embodiment. Here, similarly as in the first embodiment, the position estimation reference signal transmitted from the mobile station device 100 is received at the base station device 200 after as much delay as a transmission time of an uplink transmission path. However, in this second embodiment, the base station transmits the position estimation response signal at independent timing without establishing synchronization with the received position estimation reference signal. On the other hand, the base station measures the phase difference (first phase difference) between the received position estimation reference signal and the position estimation response signal to be transmitted, and includes information on this first phase difference in the position estimation response signal.

The mobile station device 100 receives this position estimation response signal after as much delay as a transmission time of a downlink transmission path, and measures the phase difference (second phase difference) between the phase of the transmitted position estimation reference signal an the phase of the received position estimation response signal. Here, the measured first and second phase differences can be converted into time values A [sec.] and B [sec.], respectively. In addition, suppose that the first and second unique signal sequences PN1 and PN2 have the same period g [sec.]. In this case, a transmission delay time for going and returning can be given by d=(A+B)−g). Consequently, the distance D between the mobile station device 100 and the base station device 200 can be given by:

$$D=cd/2 \text{ [m]}$$

where c is the speed of light (which is approximately equal to $3 \times 10^8$ m/s). When the distance between the mobile station and the base station is obtained, the position of the mobile station can be estimated by the similar manner as in the first embodiment.

Note that the position estimation scheme of the present invention becomes more effective when the transmission rate of a radio transmission path is higher because the precision in the phase difference measurement can be improved. In this regard, the spread codes of CDMA (Code Division Multiple Access) provide a fast chip rate even when a data transmission rate is low, so that it is possible to use the spread codes of CDMA as the unique signal sequences used by the present invention.

In such a case, the transmission signal processing unit of the mobile station device and the base station device shown in FIG. 1 and FIG. 7 carries out a processing for spreading the other transmission signals (or dummy signals when there is no other transmission signals) and the base station position information (in a case of the base station device) by using the unique signal sequence given by the spread code of CDMA, and transmits the resulting signal as the position estimation reference signal or the position estimation response signal from the transmission unit. Else, the transmission signal processing unit of the mobile station device and the base station device shown in FIG. 1 and FIG. 7 includes the unique signal sequence given by the spread code of CDMA in the position estimation reference signal or the position estimation response signal of the prescribed format, and transmits the resulting signal from the transmission unit.

Note also that, the first and second embodiments described above have been directed to a case where the mobile station device measures the distance and estimates the mobile station position, but the similar scheme in which the base station measures the distance and estimates the mobile station position can also be realized by exchanging the roles of the base station device and the mobile station device in the above description. Here however, in a case of the position estimation using a plurality of base stations, it is necessary exchange information among the base stations so as to obtain the estimated position by combining the measured distances and the position information for a plurality of base stations.

The scheme in which the base station device measures the distance requires a larger processing load on the base station, but can reduce amount of signals in the radio section. Namely, in the cellular mobile communication in general, the base station normally transmits a regulation information, a channel structure information, etc., through a broadcast channel, and the unique signal sequence required by the present invention can be included in this broadcast channel so as to improve the efficiency because then the only new radio signal required for the position estimation will be a single signal to be transmitted by the mobile station. In particular, in a case of using the spread codes as the unique signal sequences in the CDMA mobile communication, the spread codes are already contained in information transmitted by the broadcast channel so that it is not even necessary to add a new information element to the broadcast channel.

Figure 9:
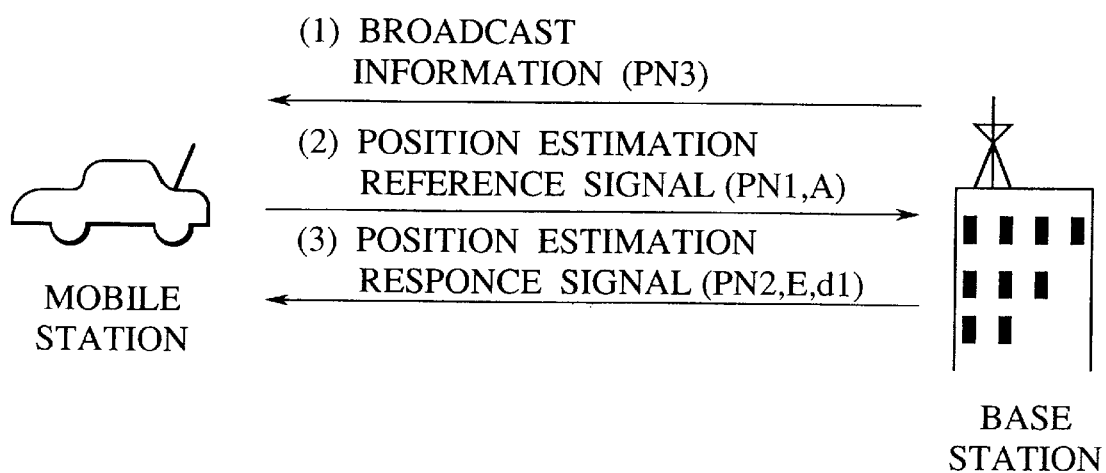
FIG. 9 is a schematic diagram of signals exchanged between a mobile station device and a base station device for realizing a mobile station position estimation scheme according to the third embodiment of the present invention.
Figure 10:
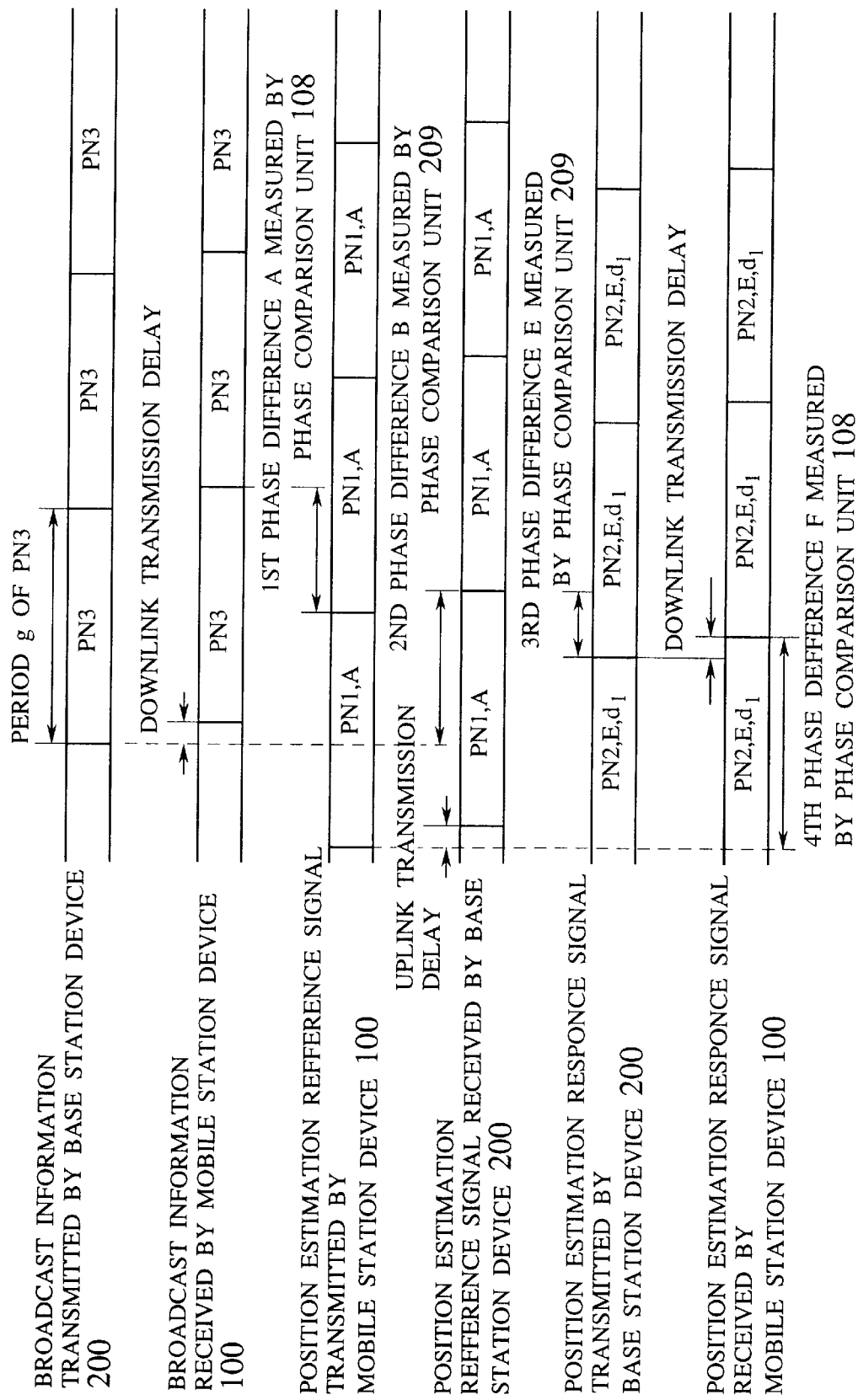
FIG. 10 is a timing chart for explaining a manner of calculating a distance between a mobile station and a base station in a mobile station position estimation scheme according to the third embodiment of the present invention.

Referring now to FIG. 9 and FIG. 10, the third embodiment of a mobile station position estimation scheme for a cellular mobile communication system according to the present invention will be described in detail.

This third embodiment is directed to a case of improving the precision in the position estimation by utilizing the broadcast channel while using signals going and returning for the purpose of the position estimation. FIG. 9 shows signals exchanged in the radio section according to the third embodiment.

In FIG. 9, the base station broadcasts a broadcast information including a unique signal sequence PN3 through a broadcast channel. Every mobile station which is capable of communicating with this base station can receive this broadcast channel. The mobile station then estimates a phase difference (first phase difference) A between the phase of the unique signal sequence PN3 in the received broadcast channel and the phase of the unique signal sequence PN1 in the position estimation reference signal to be transmitted, and transmits the position estimation reference signal including A and PN1.

The base station then measures a phase difference (second phase difference) B between the phase of PN1 in the received position estimation reference signal and the phase of PN3 in the transmitted broadcast information, as well as a phase difference (third phase difference) E between the phase of PN1 in the received position estimation reference signal and the phase of the unique signal sequence PN2 in the position estimation response signal to be transmitted, and calculates a first estimated distance d1 from A and B, while transmitting the position estimation response signal including E, d1 and PN2.

The mobile station then measures a phase difference (fourth phase difference) F between the phase of PN2 in the received position estimation response signal and the phase of PN1 in the transmitted position estimation reference signal, calculates a second estimated distance d2 from E and F, and obtains the estimated distance by averaging the obtained d1 and d2. Here, it is also possible to take a weighted average of d1 and d2 using reliabilities of d1 and d2 as weights. If there is a relationship between the phases of PN2 and PN3, it is also possible to use A and B in obtaining d2.

FIG. 10 is a timing chart for explaining the principle for calculating the distance between the base station and the mobile station in this third embodiment. Here, the symbols shown in FIG. 10 are as described above. The base station calculates the transmission delay time d1 and the distance D1 between the mobile station and the base station by using the phase differences A and B converted into time values, as follows.

$$d1=(A+B)-g$$

$$D1=cd1/2$$

On the other hand, the mobile station calculates the transmission delay time d2 and the distance D2 between the mobile station and the base station by using the phase differences E and F converted into time values, as follows.

$$d2=(E+F)-g$$

$$D2=cd2/2$$

Then, the mobile station obtains the estimated distance D by averaging D1 and D2, as follows.

$$D=(D1+D2)/2$$

In practice, the different radio signals have different receiving level, multipath occurrence state, etc., so that A, B, E and F have different reliabilities. For this reason, it is also possible to take a weighted average of D1 and D2 using reliabilities of D1 and D2 as weights.

Note that this third embodiment has been directed to a case in which the mobile station measures the phase difference between PN3 in the broadcast channel and PN1 in the mobile station transmission signal, but it is also possible for the mobile station to transmit PN1 in synchronization with PN3 similarly as in the first embodiment described above. In such a case, the manner for calculating the distance will be substantially the same as in the first embodiment.

Note also that, in a case of realizing the position estimation using a plurality of base stations, it is necessary for the mobile station to exchange the position estimation reference signal and the position estimation response signal with each base station, so that amount of signals in the radio section increases. In addition, there are cases where the position estimation precision can be lowered because of differences in the distance measurement time with respect to different base stations. For this reason, it is effective to adopt a scheme in which the mobile station carries out the simultaneous multi-code transmission in a plurality of code division multiplexed channels for signals to be transmitted to a plurality of base stations. Alternatively, it is also effective to adopt a scheme for dividing the transmission channel into slots and time division multiplexing signals to be transmitted to a plurality of base stations into the transmission channel of a frame structure.

In practice, the received signal contains signals coming through a plurality of transmission paths (multipath) in overlap. The scheme of the present invention is capable of realizing the accurate position estimation when it is possible to measure the phase of direct wave, and under the multipath environment, it is possible to keep error small by extracting a signal having the shortest delay time and using it for the phase measurement. Consequently, the phase detection unit of the mobile station device and the base station device shown in FIG. 1 and FIG. 7 detects the phase by receiving the receiving timing information for a signal having the shortest delay time from the reception unit. In the case of using a RAKE receiver in the CDMA mobile communication, a timing of a finger having the shortest delay time will be used. Note however that it is also possible to carry out the check of the phase, the judgement of the signal, etc., by using signal after the RAKE combining.

As described, according to the present invention, one of the base station and the mobile station transmits the first unique signal sequence, and the other one of the base station and the mobile station transmits the second unique signal sequence in synchronization with the first unique signal sequence. Then, that one of the base station and the mobile station estimates the position of the mobile station by calculating the estimated distance between the base station and the mobile station according to the phase difference between the first and second unique signal sequences, so that it is possible to estimate the position of the mobile station in a simple manner even in the general cellular mobile communication systems in which base stations are not synchronized.

Also, according to the present invention, one of the base station and the mobile station transmits the first unique signal sequence, and the other one of the base station and the mobile station calculates a first phase difference between the first unique signal sequence and the second unique signal sequence to be transmitted, and transmits information on the first phase difference and the second unique signal sequence to that one of the base station and the mobile station without establishing synchronization with respect to the first unique signal sequence. Then, that one of the base station and the mobile station calculates a second phase difference between the first unique signal sequence and the received second unique signal sequence, and estimates the position of the mobile station by calculating the estimated distance between the base station and the mobile station according to information on the first phase difference and the second phase difference, so that it is possible to estimate the position of the mobile station in a simple manner even in the general cellular mobile communication systems in which base stations are not synchronized.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A mobile station position estimation method in a cellular mobile communication for carrying out communications between mobile stations and base stations, comprising the steps of:

(a) exchanging between a base station and a mobile station a first signal sequence and a second signal sequence which are uniquely predetermined for the mobile station; and (b) estimating a position of the mobile station at one station among the base station and the mobile station, by obtaining a phase difference between the first signal sequence and the second signal sequence and calculating an estimated distance between the base station and the mobile station according to the phase difference;

wherein at the step (a), said one station transmits the first signal sequence to another station among the base station and the mobile station, and said another station transmits the second signal sequence to said one station in synchronization with the first signal sequence as received by said one station; and at the step (b), said one station obtains the phase difference by comparing phases of the first signal sequence as transmitted by said one station and the second signal sequence as received by said one station.

2. The method of claim 1, wherein when multipath signal is received at the step (a), said another station transmits the second signal sequence in synchronization with the first signal sequence received from a path having a shortest delay time.

3. The method of claim 1, wherein when multipath signal is received at the step (a), said one station obtains the phase difference by using the second signal sequence received from a path having a shortest delay time at the step (b).

4. The method of claim 1, wherein the cellular mobile communication is a mobile communication in CDMA scheme, and the first signal sequence and the second signal sequence are spread codes of CDMA scheme.

5. The method of claim 1, wherein the cellular mobile communication uses base stations each of which has a broadcast channel for transmitting information to be broadcast to all mobile stations, and said one station is the base station; and at the step (a), the base station transmits the first signal sequence through the broadcast channel.

6. The method of claim 1, wherein the mobile station exchanges the first signal sequence and the second signal sequence with respect to each one of a plurality of base stations at the step (a), and the step (b) calculates estimated distances of the mobile station with respect to said plurality of base stations separately and estimates the position of the mobile station by combining the estimated distances of the mobile station with respect to said plurality of base stations.

7. The method of claim 6, wherein at the step (a), the mobile station carries out simultaneous multi-code transmission by code division multiplexing signals to be transmitted with respect to said plurality of base stations.

8. The method of claim 6, wherein at the step (a), the mobile station carries out transmission by time division multiplexing signals to be transmitted to said plurality of base stations into a channel of a frame structure.

9. The method of claim 1, wherein said one station is the mobile station, and at the step (a), the base station transmits through a broadcast channel a third signal sequence which is uniquely predetermined for the mobile station, before the mobile station transmits the first signal sequence to the base station, and the mobile station transmits the first signal sequence to the base station in synchronization with the third signal sequence as received by the mobile station.

10. The method of claim 1, wherein said one station is the mobile station, and at the step (a), the base station transmits through a broadcast channel a third signal sequence which is uniquely predetermined for the mobile station, before the mobile station transmits the first signal sequence to the base station, the mobile station obtains a first phase difference by comparing phases of the third signal sequence as received by the mobile station and the first signal sequence to be transmitted by the mobile station and transmits information on the first phase difference and the second signal sequence, and the base station obtains a second phase difference by comparing phases of the first signal sequence as received by the base station and the third signal sequence as transmitted by the base station, calculates a first estimated distance between the base station and the mobile station from the first phase difference and the second phase difference, obtains a third phase difference by comparing phases of the first signal sequence as received by the base station and the second signal sequence to be transmitted by the base station, and transmits information on the third phase difference, information on the first estimated distance and the second signal sequence to the mobile station; and at the step (b), the mobile station obtains a fourth phase difference by comparing phases of the first signal sequence as transmitted by the mobile station and the second signal sequence as received by the mobile station, calculates a second estimated distance between the base station and the mobile station from the third phase difference and the fourth phase difference, and calculates the estimated distance from the first estimated distance and the second estimated distance.

11. The method of claim 1, wherein the step (b) estimates the position of the mobile station to be within an estimated position area obtained by accounting for a prescribed error in positions distanced by the estimated distance from the base station in a service area of the base station; and when the mobile station exchanges the first signal sequence and the second signal sequence with respect to each one of a plurality of base stations at the step (a), the step (b) calculates estimated distances of the mobile station with respect to said plurality of base stations separately, and estimates the position of the mobile station to be within an area in which a plurality of estimated position areas obtained from the estimated distances of the mobile station with respect to said plurality of base stations are overlapping.

12. The method of claim 1, wherein the step (b) estimates the position of the mobile station to be within an estimated position area obtained by accounting for a prescribed error in positions distanced by the estimated distance from the base station in a sector of the base station which is currently in communication with the mobile station; and when the mobile station exchanges the first signal sequence and the second signal sequence with respect to each one of a plurality of base stations at the step (a), the step (b) calculates estimated distances of the mobile station with respect to said plurality of base stations separately, and estimates the position of the mobile station to be within an area in which a plurality of estimated position areas obtained from the estimated distances of the mobile station with respect to said plurality of base stations are overlapping.

13. A mobile station position estimation method in a cellular mobile communication for carrying out communications between mobile stations and base stations, comprising the steps of:

(a) exchanging between a base station and a mobile station a first signal sequence and a second signal sequence which are uniquely predetermined for the mobile station; and (b) estimating a position of the mobile station at one station among the base station and the mobile station, by obtaining a phase difference between the first signal sequence and the second signal sequence and calculating an estimated distance between the base station and the mobile station according to the phase difference;

wherein at the step (a), said one station transmits the first signal sequence to another station among the base station and the mobile station, and said another station obtains a first phase difference by comparing phases of the first signal sequence as received by said another station and the second signal sequence to be transmitted by said another station, and transmits information on the first phase difference and the second signal sequence to said one station; and at the step (b), said one station obtains a second phase difference by comparing phases of the first signal sequence as transmitted by said one station and the second signal sequence as received by said one station, and calculates the estimated distance by using the first phase difference and the second phase difference.

14. The method of claim 13, wherein when multipath signal is received at the step (a), said another station obtains the first phase difference by using the first signal sequence received from a path having a shortest delay time.

15. The method of claim 13, wherein when multipath signal is received at the step (a), said one station obtains the second phase difference by using the second signal sequence received from a path having a shortest delay time at the step (b).

16. The method of claim 13, wherein the cellular mobile communication is a mobile communication in CDMA scheme, and the first signal sequence and the second signal sequence are spread codes of CDMA scheme.

17. The method of claim 13, wherein the cellular mobile communication uses base stations each of which has a broadcast channel for transmitting information to be broadcast to all mobile stations, and said one station is the base station; and at the step (a), the base station transmits the first signal sequence through the broadcast channel.

18. The method of claim 13, wherein the mobile station exchanges the first signal sequence and the second signal sequence with respect to each one of a plurality of base stations at the step (a), and the step (b) calculates estimated distances of the mobile station with respect to said plurality of base stations separately and estimates the position of the mobile station by combining the estimated distances of the mobile station with respect to said plurality of base stations.

19. The method of claim 18, wherein at the step (a), the mobile station carries out simultaneous multi-code transmission by code division multiplexing signals to be transmitted with respect to said plurality of base stations.

20. The method of claim 18, wherein at the step (a), the mobile station carries out transmission by time division multiplexing signals to be transmitted to said plurality of base stations into a channel of a frame structure.

21. The method of claim 13, wherein said one station is the mobile station, and at the step (a), the base station transmits through a broadcast channel a third signal sequence which is uniquely predetermined for the mobile station, before the mobile station transmits the first signal sequence to the base station, and the mobile station transmits the first signal sequence to the base station in synchronization with the third signal sequence as received by the mobile station.

22. The method of claim 13, wherein said one station is the mobile station, and at the step (a), the base station transmits through a broadcast channel a third signal sequence which is uniquely predetermined for the mobile station, before the mobile station transmits the first signal sequence to the base station, the mobile station obtains a first phase difference by comparing phases of the third signal sequence as received by the mobile station and the first signal sequence to be transmitted by the mobile station and transmits information on the first phase difference and the second signal sequence, and the base station obtains a second phase difference by comparing phases of the first signal sequence as received by the base station and the third signal sequence as transmitted by the base station, calculates a first estimated distance between the base station and the mobile station from the first phase difference and the second phase difference, obtains a third phase difference by comparing phases of the first signal sequence as received by the base station and the second signal sequence to be transmitted by the base station, and transmits information on the third phase difference, information on the first estimated distance and the second signal sequence to the mobile station; and at the step (b), the mobile station obtains a fourth phase difference by comparing phases of the first signal sequence as transmitted by the mobile station and the second signal sequence as received by the mobile station, calculates a second estimated distance between the base station and the mobile station from the third phase difference and the fourth phase difference, and calculates the estimated distance from the first estimated distance and the second estimated distance.

23. The method of claim 13, wherein the step (b) estimates the position of the mobile station to be within an estimated position area obtained by accounting for a prescribed error in positions distanced by the estimated distance from the base station in a service area of the base station; and when the mobile station exchanges the first signal sequence and the second signal sequence with respect to each one of a plurality of base stations at the step (a), the step (b) calculates estimated distances of the mobile station with respect to said plurality of base stations separately, and estimates the position of the mobile station to be within an area in which a plurality of estimated position areas obtained from the estimated distances of the mobile station with respect to said plurality of base stations are overlapping.

24. The method of claim 13, wherein the step (b) estimates the position of the mobile station to be within an estimated position area obtained by accounting for a prescribed error in positions distanced by the estimated distance from the base station in a sector of the base station which is currently in communication with the mobile station; and when the mobile station exchanges the first signal sequence and the second signal sequence with respect to each one of a plurality of base stations at the step (a), the step (b) calculates estimated distances of the mobile station with respect to said plurality of base stations separately, and estimates the position of the mobile station to be within an area in which a plurality of estimated position areas obtained from the estimated distances of the mobile station with respect to said plurality of base stations are overlapping.

25. A base station device at a base station in a cellular mobile communication system for carrying out communications between mobile stations and base stations, comprising:

a reception unit for receiving a first signal sequence transmitted by a mobile station, which is uniquely predetermined for the mobile station; and a transmission unit for transmitting a second signal sequence which is uniquely predetermined for the mobile station, to the mobile station in synchronization with the first signal sequence received by the reception unit, so as to enable the mobile station to estimate a position of the mobile station by calculating an estimated distance between the base station and the mobile station according to a phase difference between the first signal sequence and the second signal sequence.

26. The base station device of claim 25, wherein when the reception unit receives multipath signal, the transmission unit transmits the second signal sequence in synchronization with the first signal sequence received from a path having a shortest delay time.

27. A mobile station device at a mobile station in a cellular mobile communication system for carrying out communications between base stations and mobile stations, comprising:
   a reception unit for receiving a first signal sequence transmitted by a base station, which is uniquely predetermined for the mobile station; and
   a transmission unit for transmitting a second signal sequence which is uniquely predetermined for the mobile station, to the base station in synchronization with the first signal sequence received by the reception unit, so as to enable the base station to estimate a position of the mobile station by calculating an estimated distance between the base station and the mobile station according to a phase difference between the first signal sequence and the second signal sequence.

28. The mobile station device of claim 27, wherein when the reception unit receives multipath signal, the transmission unit transmits the second signal sequence in synchronization with the first signal sequence received from a path having a shortest delay time.

29. A base station device at a base station in a cellular mobile communication system for carrying out communications between mobile stations and base stations, comprising:
   a transmission unit for transmitting to a mobile station a first signal sequence which is uniquely predetermined for the mobile station;
   a reception unit for receiving a second signal sequence transmitted by the mobile station, which is uniquely predetermined for the mobile station; and
   a position estimation unit for estimating a position of the mobile station by obtaining a phase difference by comparing phases of the first signal sequence transmitted by the transmission unit and the second signal sequence received by the reception unit, and calculating an estimated distance between the base station and the mobile station according to the phase difference.

30. The base station device of claim 29, wherein when the reception unit receives multipath signal, the position estimation unit obtains the phase difference by using the second signal sequence received from a path having a shortest delay time.

31. A mobile station device at a mobile station in a cellular mobile communication system for carrying out communications between mobile stations and base stations, comprising:
   a transmission unit for transmitting to a base station a first signal sequence which is uniquely predetermined for the mobile station;
   a reception unit for receiving a second signal sequence transmitted by the base station, which is uniquely predetermined for the mobile station; and
   a position estimation unit for estimating a position of the mobile station by obtaining a phase difference by comparing phases of the first signal sequence transmitted by the transmission unit and the second signal sequence received by the reception unit, and calculating an estimated distance between the base station and the mobile station according to the phase difference.

32. The mobile station device of claim 31, wherein when the reception unit receives multipath signal, the position estimation unit obtains the phase difference by using the second signal sequence received from a path having a shortest delay time.

33. A base station device at a base station in a cellular mobile communication system for carrying out communications between mobile stations and base stations, comprising:
   a transmission unit for transmitting to a mobile station a first signal sequence which is uniquely predetermined for the mobile station;
   a reception unit for receiving a second signal sequence which is uniquely predetermined for the mobile station and information on a first phase difference indicating a phase difference between the first signal sequence and the second signal sequence as obtained by the mobile station, which are transmitted by the mobile station; and
   a position estimation unit for estimating a position of the mobile station by obtaining a second phase difference by comparing phases of the first signal sequence transmitted by the transmission unit and the second signal sequence received by the reception unit, and calculating an estimated distance between the base station and the mobile station according to the first phase difference received by the reception unit and the second phase difference.

34. The base station device of claim 33, wherein when the reception unit receives multipath signal, the position estimation unit obtains the second phase difference by using the second signal sequence received from a path having a shortest delay time.

35. A mobile station device at a mobile station in a cellular mobile communication system for carrying out communications between mobile stations and base stations, comprising:
   a transmission unit for transmitting to a base station a first signal sequence which is uniquely predetermined for the mobile station;
   a reception unit for receiving a second signal sequence which is uniquely predetermined for the mobile station and information on a first phase difference indicating a phase difference between the first signal sequence and the second signal sequence as obtained by the base station, which are transmitted by the base station; and
   a position estimation unit for estimating a position of the mobile station by obtaining a second phase difference by comparing phases of the first signal sequence transmitted by the transmission unit and the second signal sequence received by the reception unit, and calculating an estimated distance between the base station and the mobile station according to the first phase difference received by the reception unit and the second phase difference.

36. The mobile station device of claim 35, wherein when the reception unit receives multipath signal, the position estimation unit obtains the second phase difference by using the second signal sequence received from a path having a shortest delay time.

37. A base station device at a base station in a cellular mobile communication system for carrying out communications between mobile stations and base stations, comprising:

a reception unit for receiving a first signal sequence transmitted by a mobile station, which is uniquely predetermined for the mobile station; and a transmission unit for obtaining a first phase difference by comparing phases of the first signal sequence received by the reception unit and a second signal sequence which is uniquely predetermined for the mobile station, and transmitting the second signal sequence and information on the first phase difference to the mobile station, so as to enable the mobile station to obtain a second phase difference by comparing phases of the first signal sequence and the second signal sequence and estimate a position of the mobile station by calculating an estimated distance between the base station and the mobile station according to the first phase difference and the second phase difference.

38. The base station device of claim 37, wherein when the reception unit receives multipath signal, the transmission unit obtains the first phase difference by using the first signal sequence received from a path having a shortest delay time.

39. A mobile station device at a mobile station in a cellular mobile communication system for carrying out communications between mobile stations and base stations, comprising:

a reception unit for receiving a first signal sequence transmitted by a base station, which is uniquely predetermined for the mobile station; and a transmission unit for obtaining a first phase difference by comparing phases of the first signal sequence received by the reception unit and a second signal sequence which is uniquely predetermined for the mobile station, and transmitting the second signal sequence and information on the first phase difference to the base station, so as to enable the base station to obtain a second phase difference by comparing phases of the first signal sequence and the second signal sequence and estimate a position of the mobile station by calculating an estimated distance between the base station and the mobile station according to the first phase difference and the second phase difference.

40. The mobile station device of claim 39, wherein when the reception unit receives multipath signal, the transmission unit obtains the first phase difference by using the first signal sequence received from a path having a shortest delay time.

* * * * *